(12) United States Patent
Huang et al.

(10) Patent No.: US 12,522,331 B2
(45) Date of Patent: Jan. 13, 2026

(54) BIOMIMETIC TURTLE DEVICE

(71) Applicant: Pioneer Material Precision Tech Co., Ltd., New Taipei (TW)

(72) Inventors: Wei-Yu Huang, New Taipei (TW);
Tai-Yu Chen, New Taipei (TW);
Li-Yuan Yeh, New Taipei (TW);
Chang-Qi Zhang, New Taipei (TW);
Ching-Hung Liu, New Taipei (TW);
Chih-Wei Shen, New Taipei (TW)

(73) Assignee: PIONEER MATERIAL PRECISION TECH CO., LTD., New Taipei (TW)

( * ) Notice: Subject to any disclaimer, the term of this patent is extended or adjusted under 35 U.S.C. 154(b) by 393 days.

(21) Appl. No.: 18/466,669

(22) Filed: Sep. 13, 2023

(65) Prior Publication Data
US 2024/0417049 A1    Dec. 19, 2024

(30) Foreign Application Priority Data
Jun. 16, 2023 (TW) ................. 112122689

(51) Int. Cl.
| | |
|---|---|
| *B63G 8/22* | (2006.01) |
| *B63G 8/00* | (2006.01) |
| *B63G 8/04* | (2006.01) |
| *B63G 8/08* | (2006.01) |
| *B63G 8/24* | (2006.01) |
| *G05D 1/00* | (2006.01) |

(52) U.S. Cl.
CPC ............... *B63G 8/22* (2013.01); *B63G 8/001* (2013.01); *B63G 8/04* (2013.01); *B63G 8/08* (2013.01); *B63G 8/24* (2013.01); *G05D 1/048* (2013.01); *B63G 2008/004* (2013.01)

(58) Field of Classification Search
CPC ...... B63G 8/22; B63G 2008/004; B63G 8/04; B63G 8/08; B63G 8/24; B63G 8/001
See application file for complete search history.

(56) References Cited

FOREIGN PATENT DOCUMENTS

| CN | 114084322 A | * | 2/2022 | ............... B63B 3/13 |
| CN | 114834619 A | * | 8/2022 | ............... B63H 1/36 |
| CN | 115071933 A | * | 9/2022 | ............. B63C 11/52 |

* cited by examiner

*Primary Examiner* — S. Joseph Morano
*Assistant Examiner* — Jovon E Hayes
(74) *Attorney, Agent, or Firm* — HSML P.C.

(57) ABSTRACT

A biomimetic turtle device includes a trunk unit, a limb unit and a control unit. The control unit includes a water depth sensor which detects water depth where the biomimetic turtle device is, and a circuit module which receives the signal from the water depth sensor and determines if the biomimetic turtle device is at a target water depth position, wherein a driving mechanism or a weight adjusting mechanism is operated if the biomimetic turtle device is not at the target water depth position to vary the volume or weight of the trunk unit so as to adjust density of the trunk unit to thereby adjust a water depth position of the biomimetic turtle device.

11 Claims, 17 Drawing Sheets

BIOMIMETIC TURTLE DEVICE

CROSS-REFERENCE TO RELATED APPLICATION

This application claims priority to Taiwanese Invention Patent Application No. 112122689, filed on Jun. 16, 2023, and incorporated by reference herein in its entirety.

FIELD

The disclosure relates to a biomimetic turtle device, and more particularly to a biomimetic turtle device with a variable density.

BACKGROUND

Biomimetic turtle devices are mechanical devices which emulates the shape of a turtle and its swimming motion in the water. Hence, a conventional biomimetic turtle device has a pair of front limbs and a pair of rear limbs which are movable and can be controlled to ascend or descend in the water.

Although, a variety of means have been utilized to control the ascending and descending of the biomimetic turtle device, for example, through buoyant regulation. It is still desirable to find other technical means to carry out the buoyant regulation of the biomimetic turtle device.

SUMMARY

Therefore, an object of the disclosure is to provide a biomimetic turtle device that can adjust buoyant force thereof in the water by means of varying its density.

According to the disclosure, the biomimetic turtle device includes a trunk unit, a limb unit and a control unit. The trunk unit includes a trunk, a head which is connected with a front portion of the trunk, a dorsal shell which is connected with a top portion of the trunk, and at least one driving mechanism which is operable to actuate deformation of at least one of the head and the dorsal shell relative to the trunk to vary volume of the trunk unit. The limb unit includes a pair of front limb mechanisms and a pair of rear limb mechanisms. The control unit includes a water depth sensor which detects water depth where the biomimetic turtle device is and sends a signal, and a circuit module which is electronically connected with the driving mechanism, the limb unit and the water depth sensor. The circuit module receives the signal from the water depth sensor and determines if the biomimetic turtle device is at a target water depth position, wherein the driving mechanism is operated to vary the volume of the trunk unit if the biomimetic turtle device is not at the target water depth position so as to adjust density of the trunk unit to thereby adjust a water depth position of the biomimetic turtle device.

According to the disclosure, the biomimetic turtle device includes a trunk unit, a limb unit and a control unit. The trunk unit includes a trunk which has at least one water reservoir therein, a head which is connected with a front portion of the trunk, a dorsal shell which is connected with a top portion of the trunk, and at least one weight adjusting mechanism which is disposed within the trunk and operable to actuate water storage in and discharging from the water reservoir to vary weight of the trunk unit. The limb unit includes a pair of front limb mechanisms and a pair of rear limb mechanisms. The control unit includes a water depth sensor which detects water depth where the biomimetic turtle device is and sends a signal, and a circuit module which is electronically connected with the weight adjusting mechanism, the limb unit and the water depth sensor. The circuit module receives the signal from the water depth sensor and determines if the biomimetic turtle device is at a target water depth position, wherein the weight adjusting mechanism is operated to vary the weight of the trunk unit if the biomimetic turtle device is not at the target water depth position so as to adjust density of the trunk unit to thereby adjust a water depth position of the biomimetic turtle device.

With the control unit which is operated to adjust the density of the biomimetic turtle device by varying the volume or weight of the trunk unit based on the current water depth position of the biomimetic turtle device, the biomimetic turtle device is controllable to float upward, dive downward or to be kept at a fixed level position in the water.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
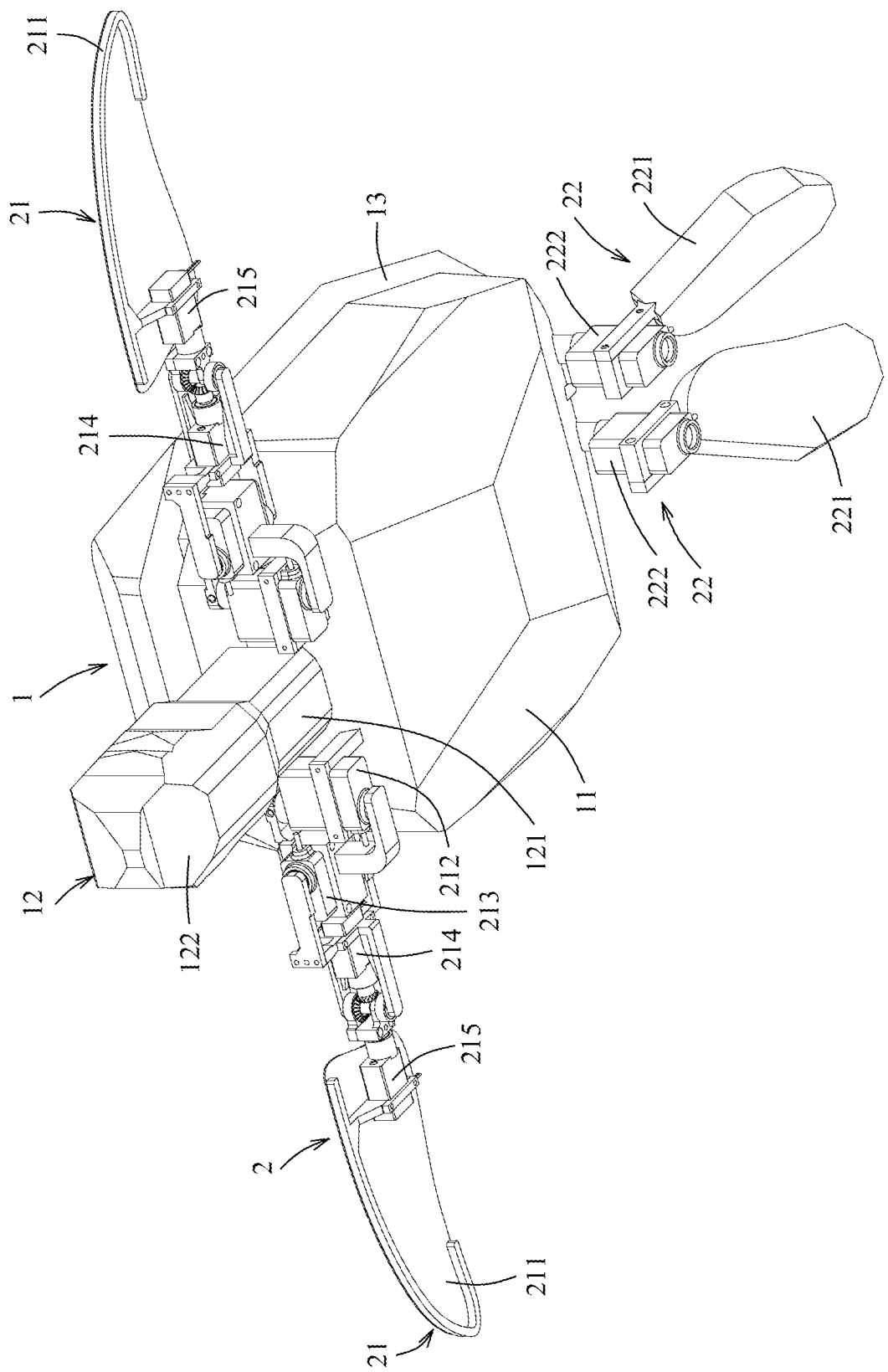
FIG. 1 is a perspective view illustrating a first embodiment of a biomimetic turtle device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 1 to 4, a first embodiment of a biomimetic turtle device according to the disclosure includes a trunk unit 1, a limb unit 2 and a control unit 3.

Figure 5:
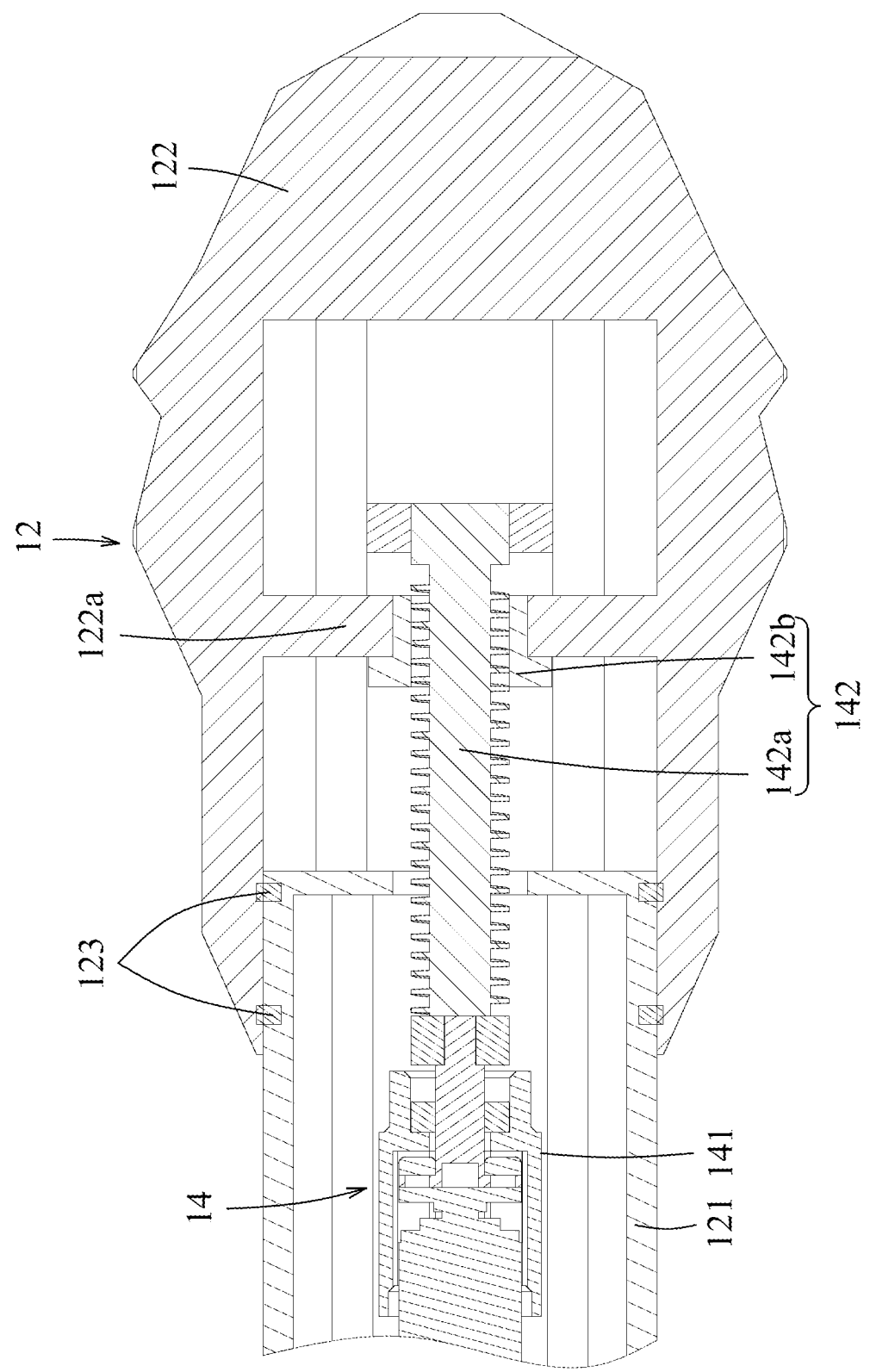
FIG. 5 is a fragmentary sectional view illustrating a state when a movable portion of a head of the first embodiment is in a forward extending position.
Figure 6:
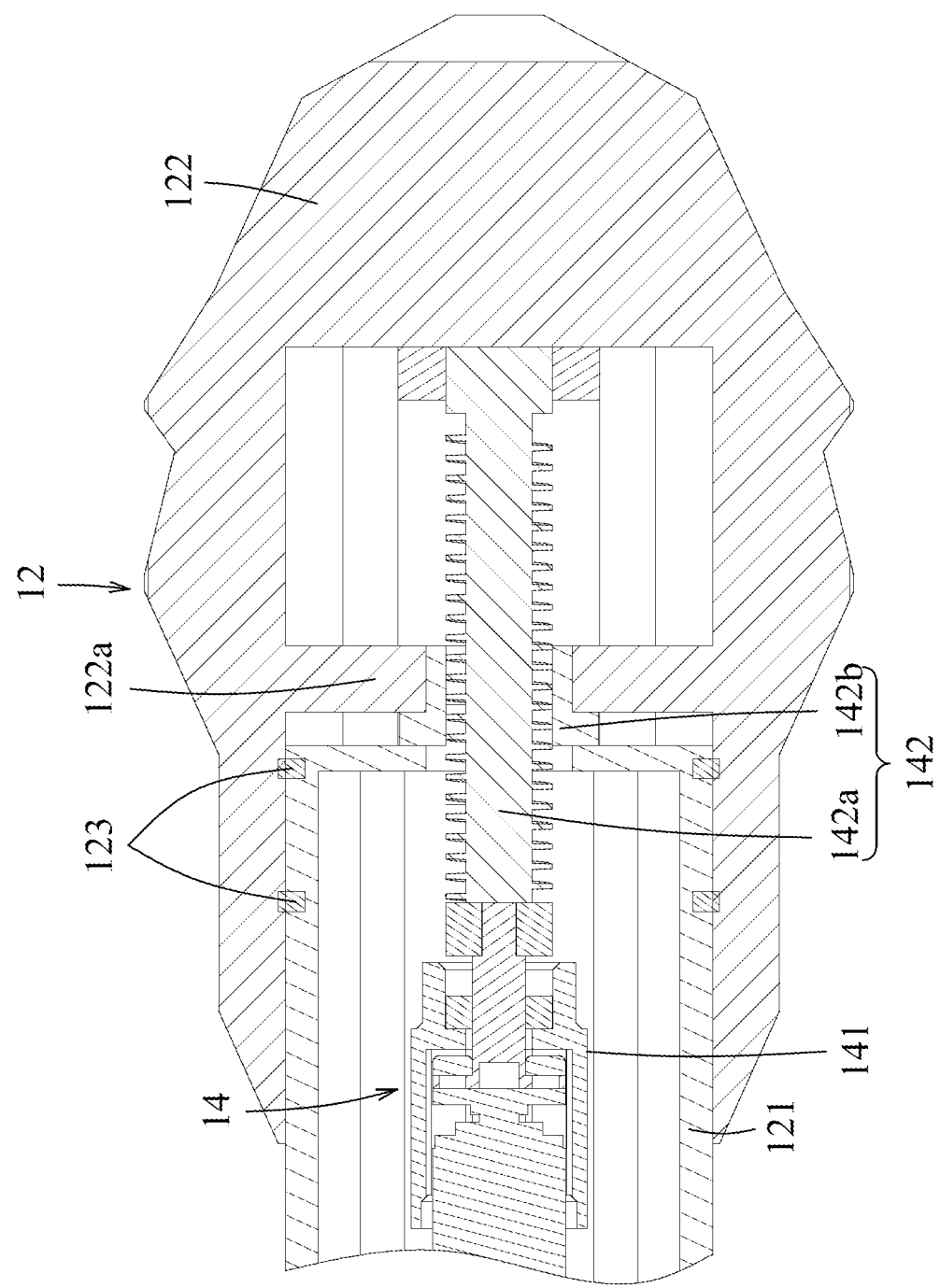
FIG. 6 is a fragmentary sectional view illustrating a state when the movable portion in the first embodiment is in a rearward retracted position.

The trunk unit 1 includes a trunk 11, a head 12 which is connected with a front portion of the trunk 11, a dorsal shell 13 which is connected with a top portion of the trunk 11, and a driving mechanism 14 which is operable to actuate deformation of the head 12 relative to the trunk 11 to vary volume of the trunk unit 1. The trunk 11 and the dorsal shell 13 cooperatively define an accommodation space 15 therein. With reference to FIGS. 1, 5 and 6, in this embodiment, the head 12 has a fixed portion 121 which is securely connected with the trunk 11, a movable portion 122 which is coaxially sleeved on the fixed portion 121 and movable relative to the fixed portion 121 between a forward extending position (see FIG. 5) and a rearward retracted position (see FIG. 6) in a front-rear direction, and two water seal rings 123 which are interposed between the fixed portion 121 and the movable portion 122 for preventing liquid entrance into the head 12. The fixed portion 121 and the movable portion 122 are hollow for accommodating the driving mechanism 14. In this embodiment, the water seal rings 123 are disposed adjacent to a front end of the fixed portion 121 and are spaced apart from each other. By means of the two water seal rings 123, water sealing is enhanced. It is noted that the head 12 alternatively may only have one water seal ring 123.

The driving mechanism 14 has a drive motor 141 and a transmission module 142 which is coupled with the drive motor 141 and the movable portion 122. The transmission module 142 has a screw bolt (142a) which extends in the front-rear direction and which is coupled with and actuated by the drive motor 141, and a screw nut (142b) which is securely disposed on the movable portion 122 and threadedly engaged with the screw bolt (142a). In this embodiment, the movable portion 122 has a support plate (122a) which has a through hole such that the screw bolt (142a) extends through the through hole. A torque generated as a result of rotation of the screw bolt (142a) is converted to a linear movement of the screw nut (142b) in the front-rear direction to move the movable portion 122 relative to the fixed portion 121 toward one of the forward extending position and the rearward retracted position. Thus, the head 12 has variable volume which is larger when the movable portion 122 is in the forward extending position than that when the movable portion 122 is in the rearward retracted position. According to the density defined as mass divided by volume, and the larger the volume is, the lower the density is, the trunk 1 has the density which is smaller when the movable portion 122 is in the forward extending position where the volume thereof is larger, and is larger when the movable portion 122 is in the rearward retracted position where the volume is smaller.

Figure 2:
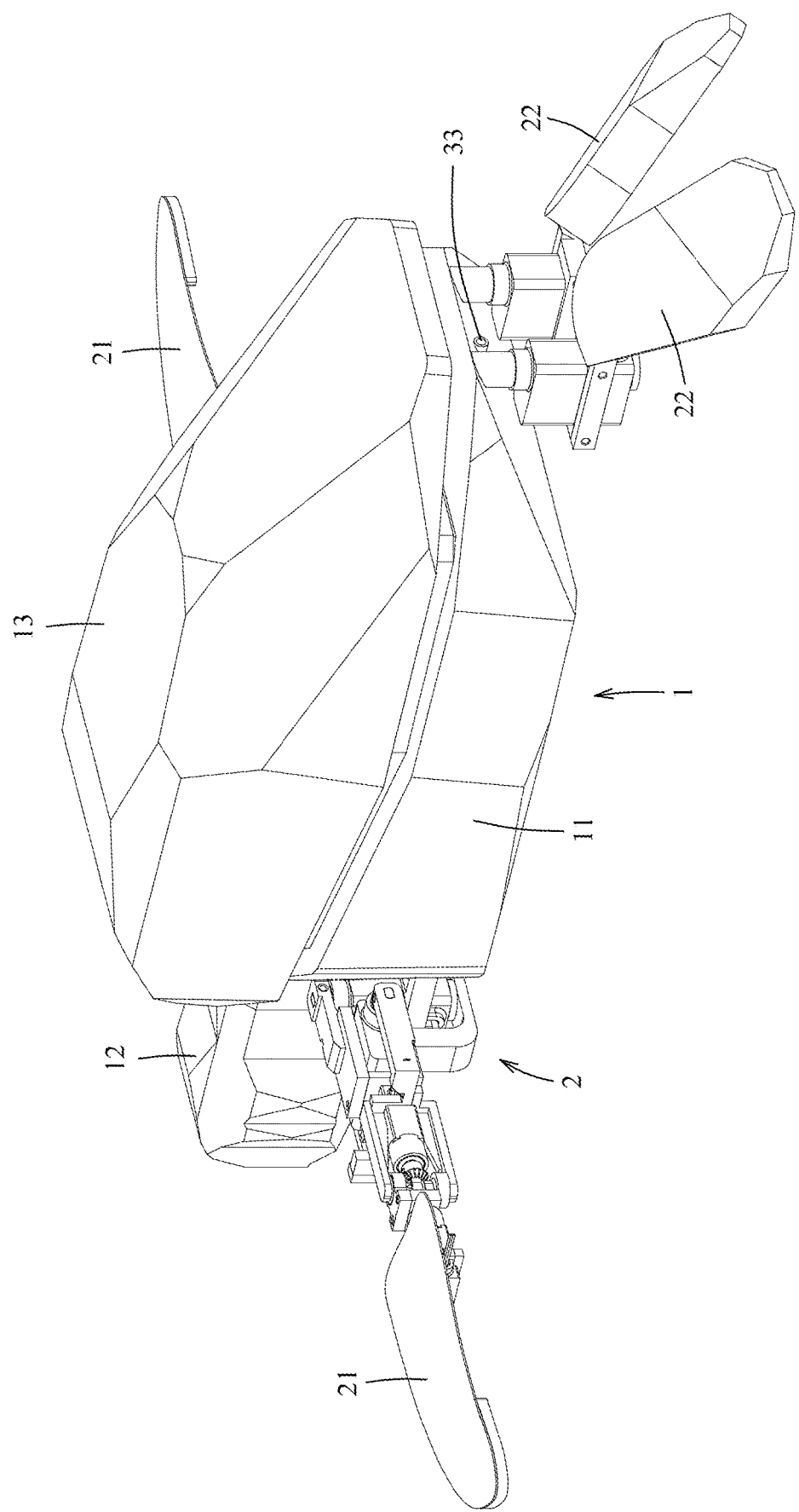
FIG. 2 is a perspective view of the first embodiment, taken from another angle.

With reference to FIGS. 1 and 2, the limb unit 2 includes a pair of front limb mechanisms 21 and a pair of rear limb mechanisms 22. Each front limb mechanism 21 includes a front flipper 211 and a first motor 212, a second motor 213, a third motor 214 and a fourth motor 215 coupled with the front flipper 211 to actuate the front flipper 211 to sway in the front-rear direction, to sway in an up-down direction, to curve, and to be rotated, respectively. Each rear limb mechanism 22 includes a hind flipper 221 and a rear motor 222 which is coupled with the hind flipper 221 to actuate the hind flipper 221 to sway in a left-right direction.

Figure 3:
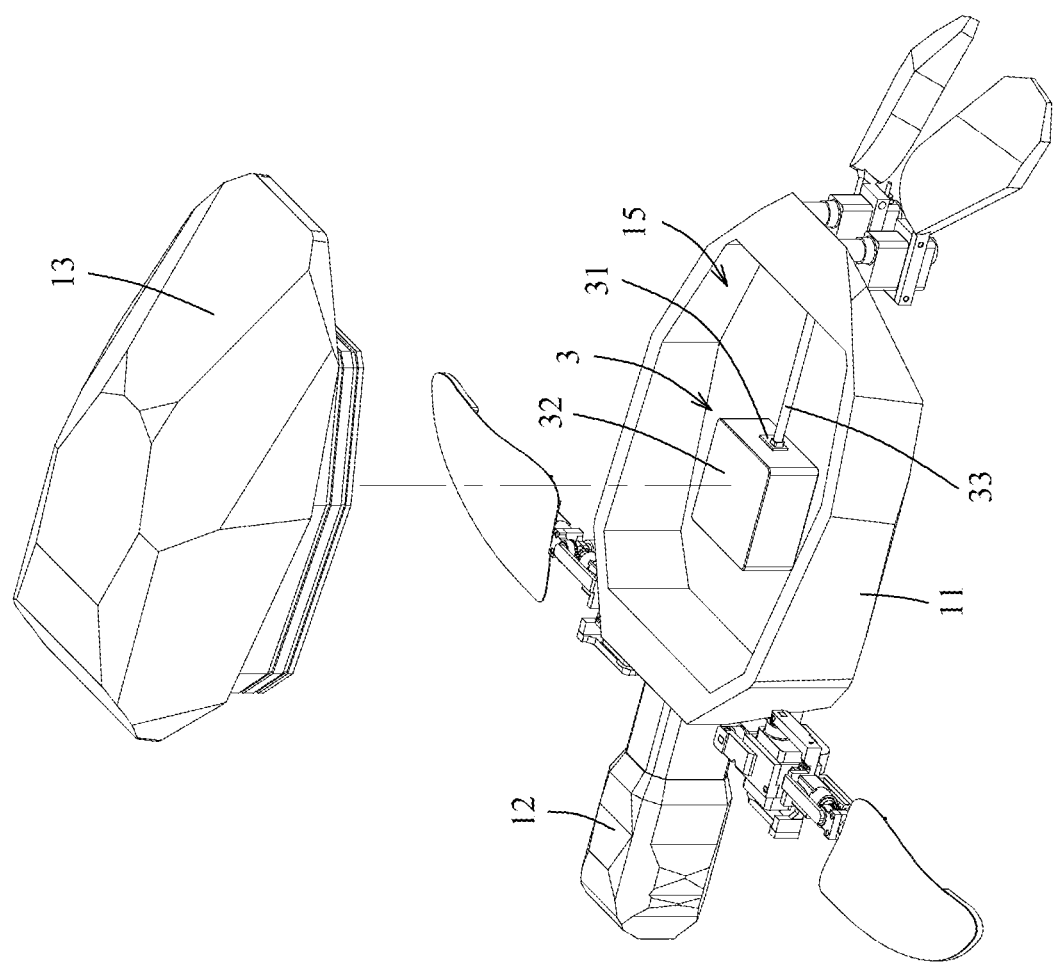
FIG. 3 is an exploded perspective view of the first embodiment.
Figure 4:
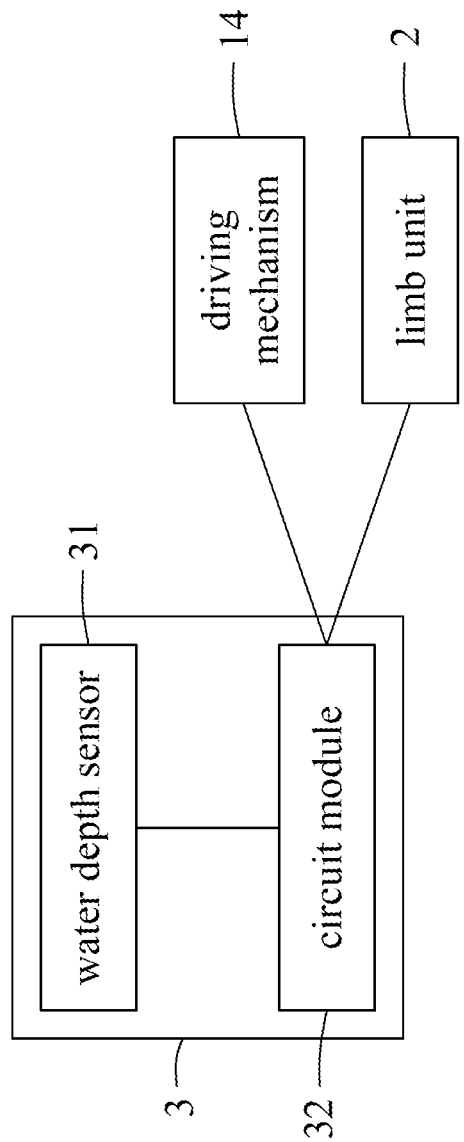
FIG. 4 is a schematic circuit block diagram of the first embodiment.

With reference to FIGS. 2, 3 and 4, the control unit 3 is received in the accommodation space 15, and includes a water depth sensor 31 which detects water depth where the biomimetic turtle device is and sends a signal, and a circuit module 32 which is electronically connected with the driving mechanism 14, the limb unit 2 and the water depth sensor 31. In this embodiment, the water depth sensor 31 is a pressure sensor, and is connected with a pipe 33 by means of a seal adhesive. The pipe 33 projects from the trunk 11 and extends into the water such that the water depth sensor 31 can sense the pressure of the water to measure the water depth and generate a signal. The circuit module 32 includes a microprocessor and a drive controller for controlling all motors in the driving mechanism 14 and the limb unit 2. The circuit module 32 receives the signal from the water depth sensor 31 and determines if the biomimetic turtle device is at a target water depth position. The driving mechanism 14 is controlled and operated to vary the volume of the trunk unit 1 if the biomimetic turtle device is not at the target water depth position so as to adjust the density of the trunk unit 1 to thereby adjust a water depth position of the biomimetic turtle device. Specifically, if the biomimetic turtle device is determined to be in a position deeper than the target water depth position, the driving mechanism 14 is controlled by the circuit module 32 and is operated to move the movable portion 122 toward the forward extending position so as to increase the volume of the trunk 11 and decrease the density of the biomimetic turtle device. The biomimetic turtle device floats upward once the density thereof is smaller than that of the water. If the biomimetic turtle device is determined to be in a position shallower than the target water depth position, the driving mechanism 14 is controlled by the circuit module 32 and is operated to move the movable portion 122 toward the rearward retracted position so as to decrease the volume of the trunk 11 and increase the density of the biomimetic turtle device. The biomimetic turtle device dives downward once the density thereof is larger than that of the water. When the biomimetic turtle device has the density that is the same as that of the water, the biomimetic turtle device is kept at a fixed level position in the water.

Figure 7:
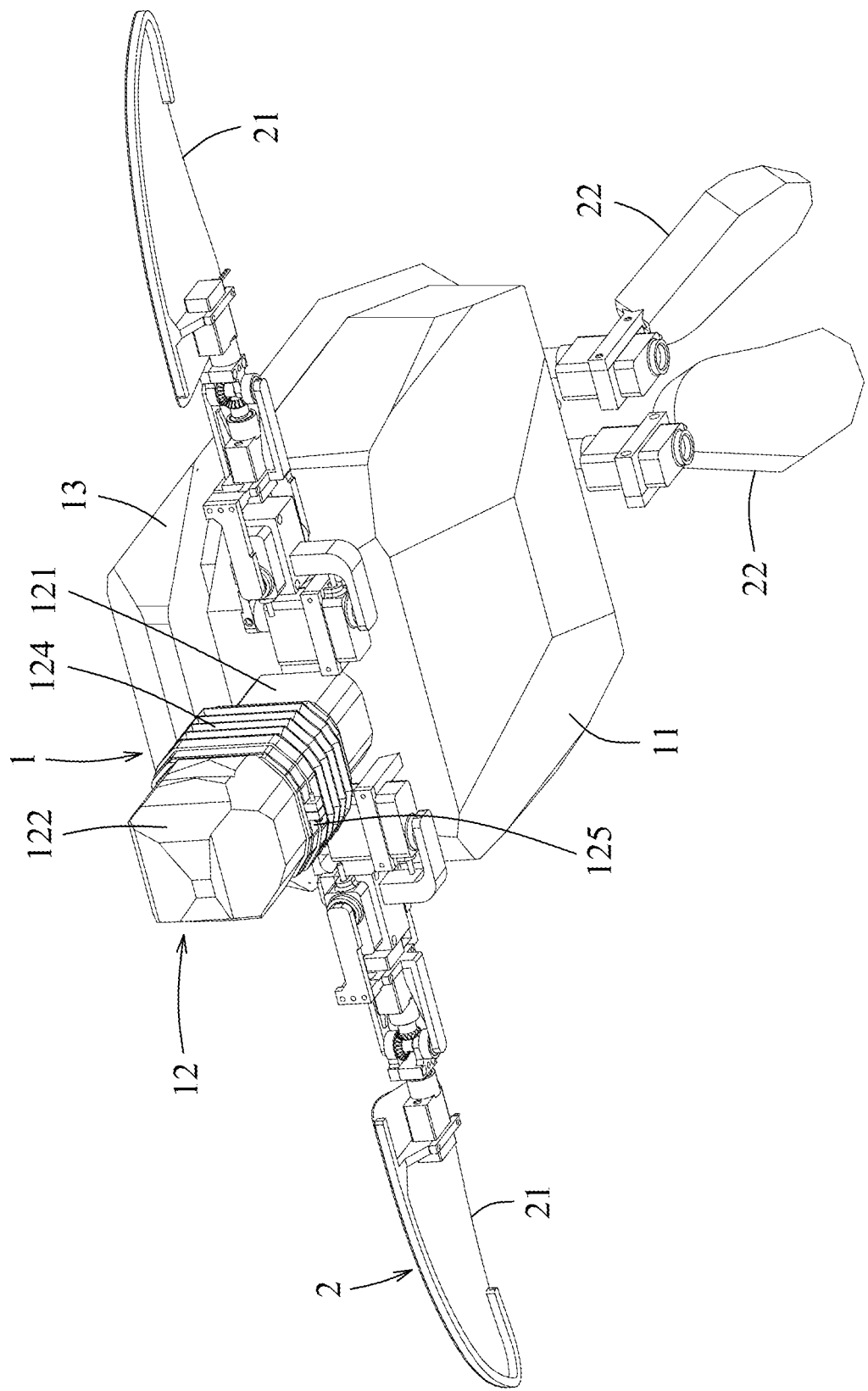
FIG. 7 is a perspective view illustrating a second embodiment of the biomimetic turtle device according to the disclosure.
Figure 8:
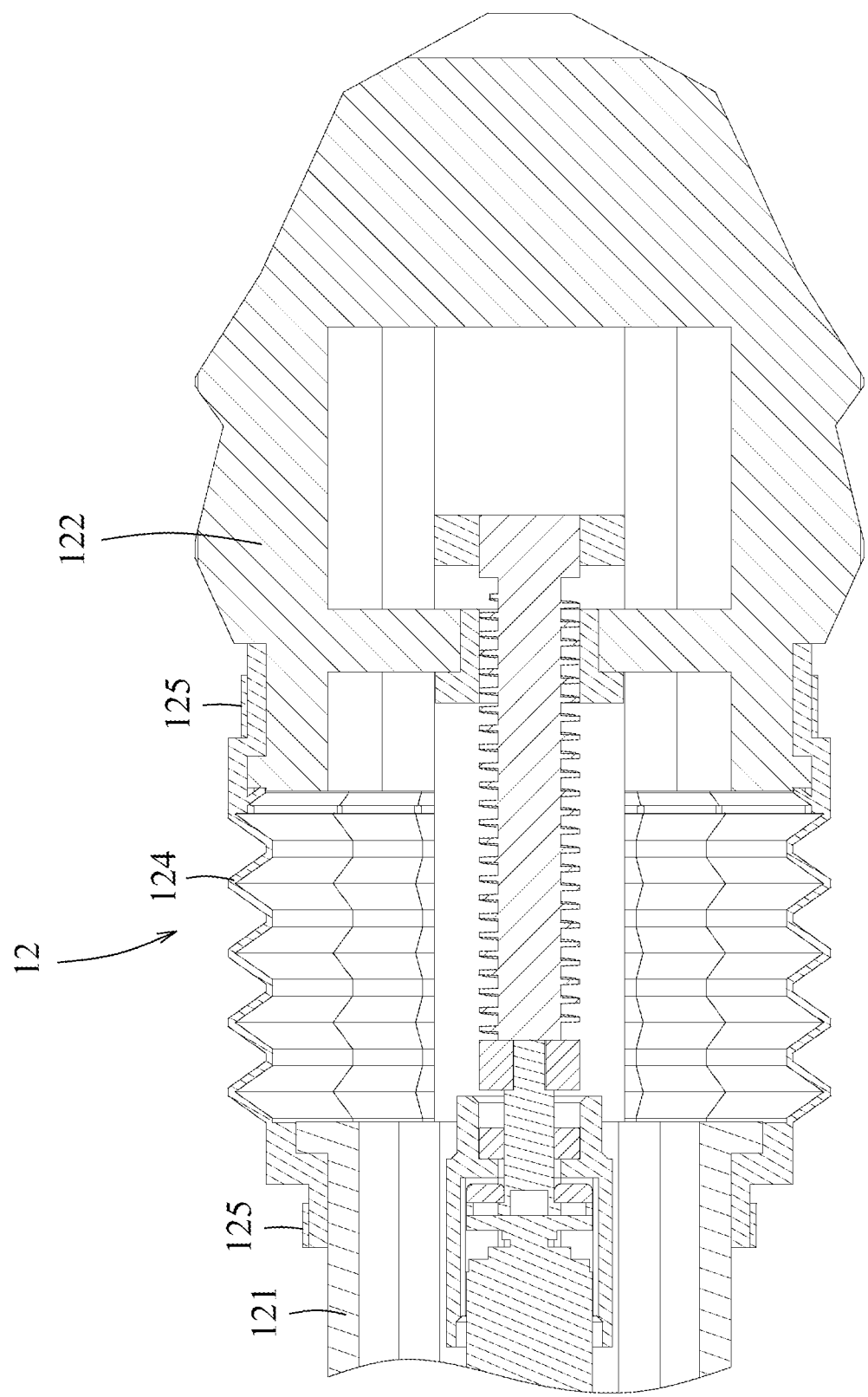
FIG. 8 is a fragmentary sectional view illustrating a state when a movable portion of a head of the second embodiment is in a forward extending position.
Figure 9:
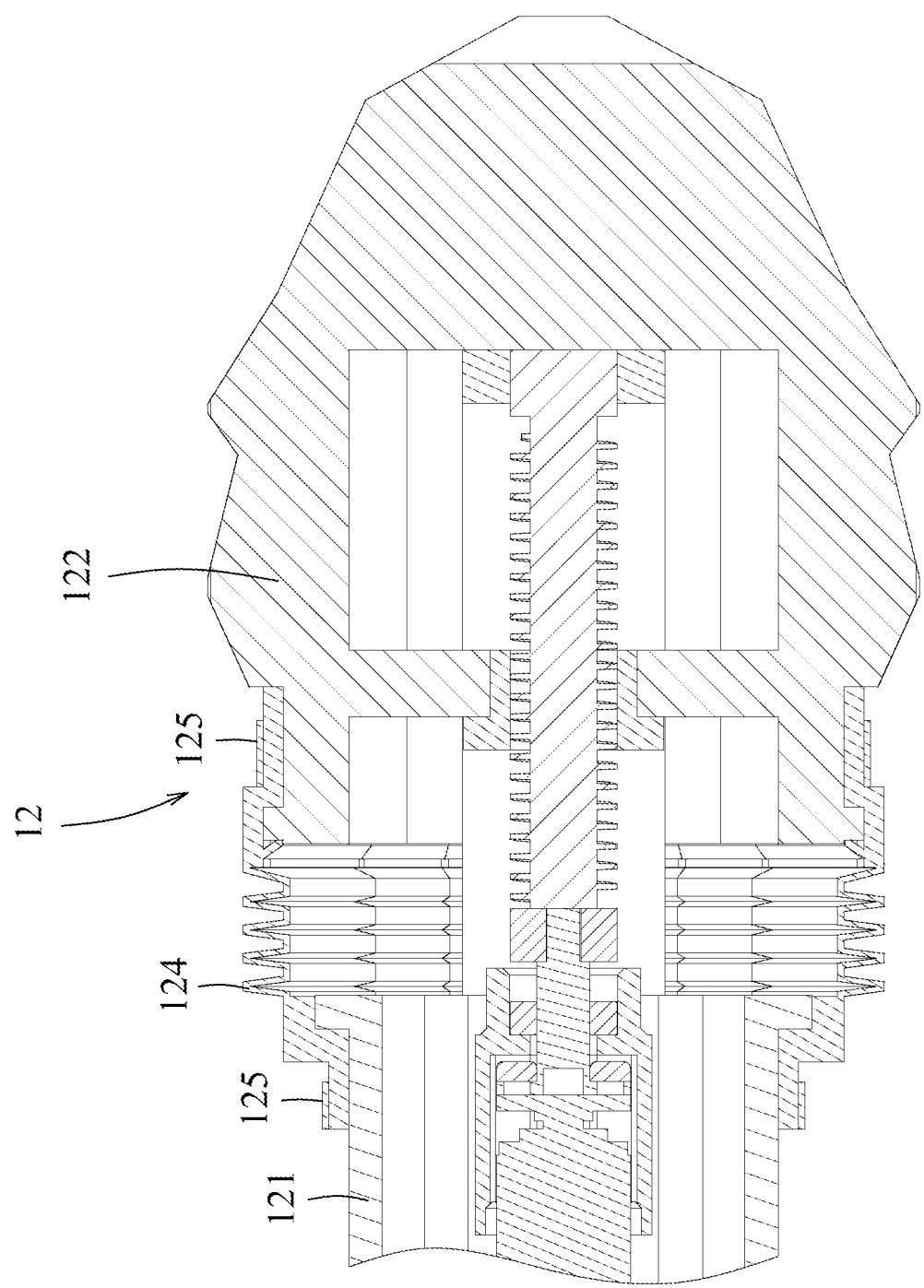
FIG. 9 is a fragmentary sectional view illustrating a state when the movable portion in the second embodiment is in a rearward retracted position.

With reference to FIGS. 7, 8 and 9, in a second embodiment, the difference from the first embodiment resides in that the head 12 has a waterproof elastomeric sleeve 124 which interconnects the fixed portion 121 and the movable portion 122 and which extends and is deformable in the front-rear direction. Specifically, the waterproof elastomeric sleeve 124 has two end portions which are respectively sleeved on the fixed portion 121 and the movable portion 122 and fixed on the fixed portion 121 and the movable portion 122 by means of two metallic snap rings 125 and seal adhesives so as to enhance the water sealing of the head 11. The waterproof elastomeric sleeve 124 is elastomerically deformable along with the movement of the movable portion 122.

Figure 10:
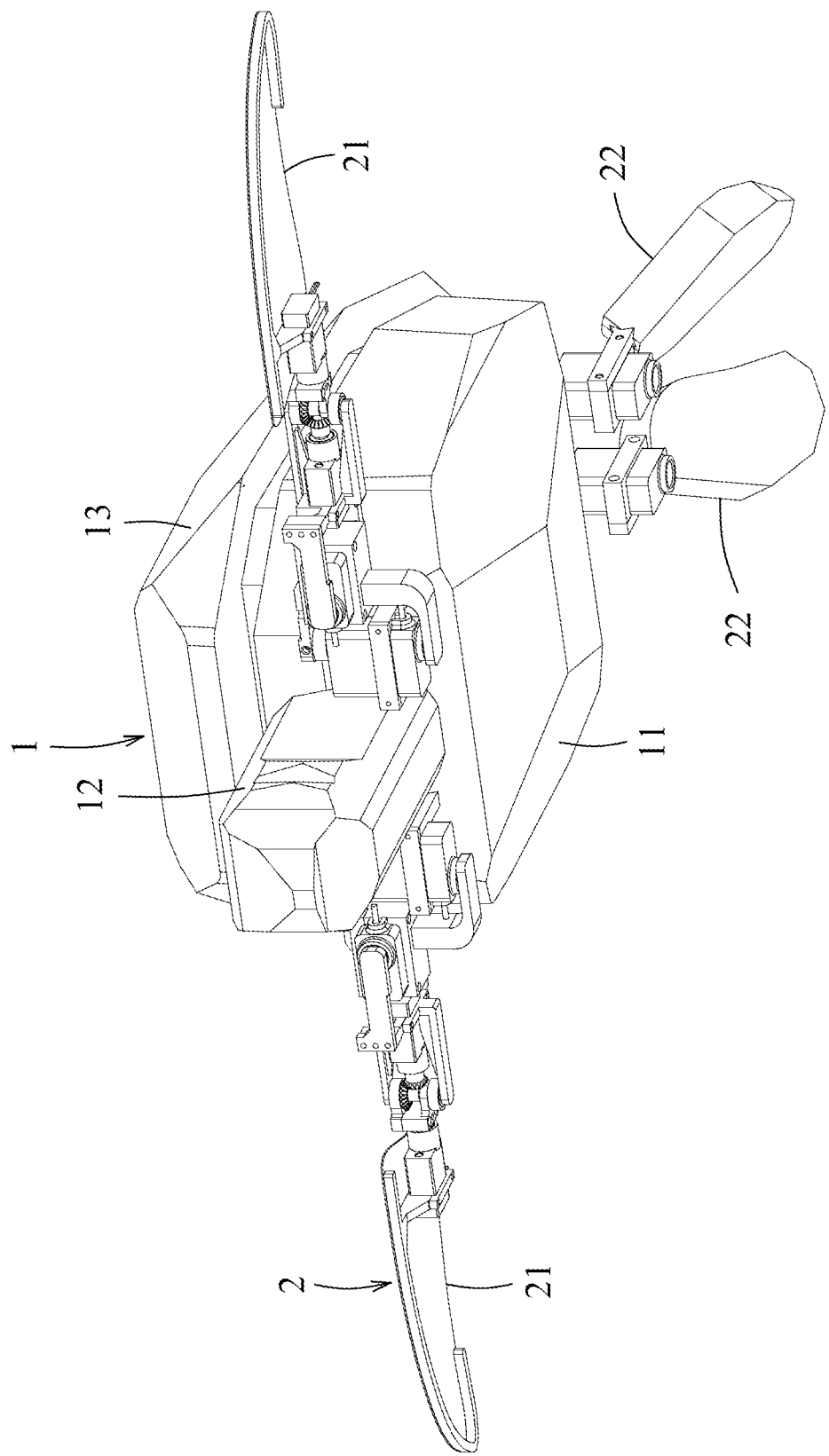
FIG. 10 is a perspective view illustrating a third embodiment of the biomimetic turtle device according to the disclosure.
Figure 11:
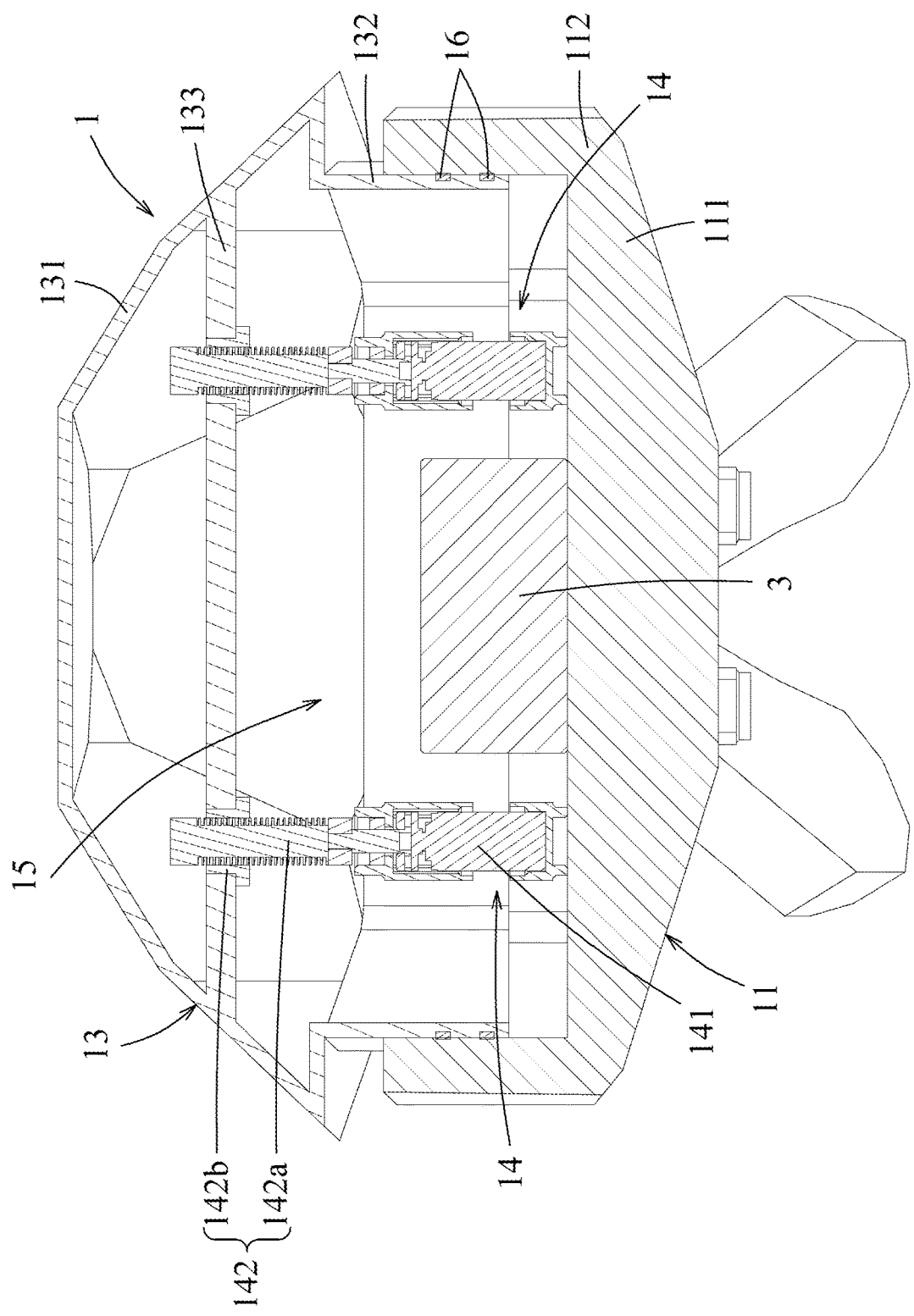
FIG. 11 is a sectional view illustrating a state when a dorsal shell of the third embodiment is in a raised up position.
Figure 12:
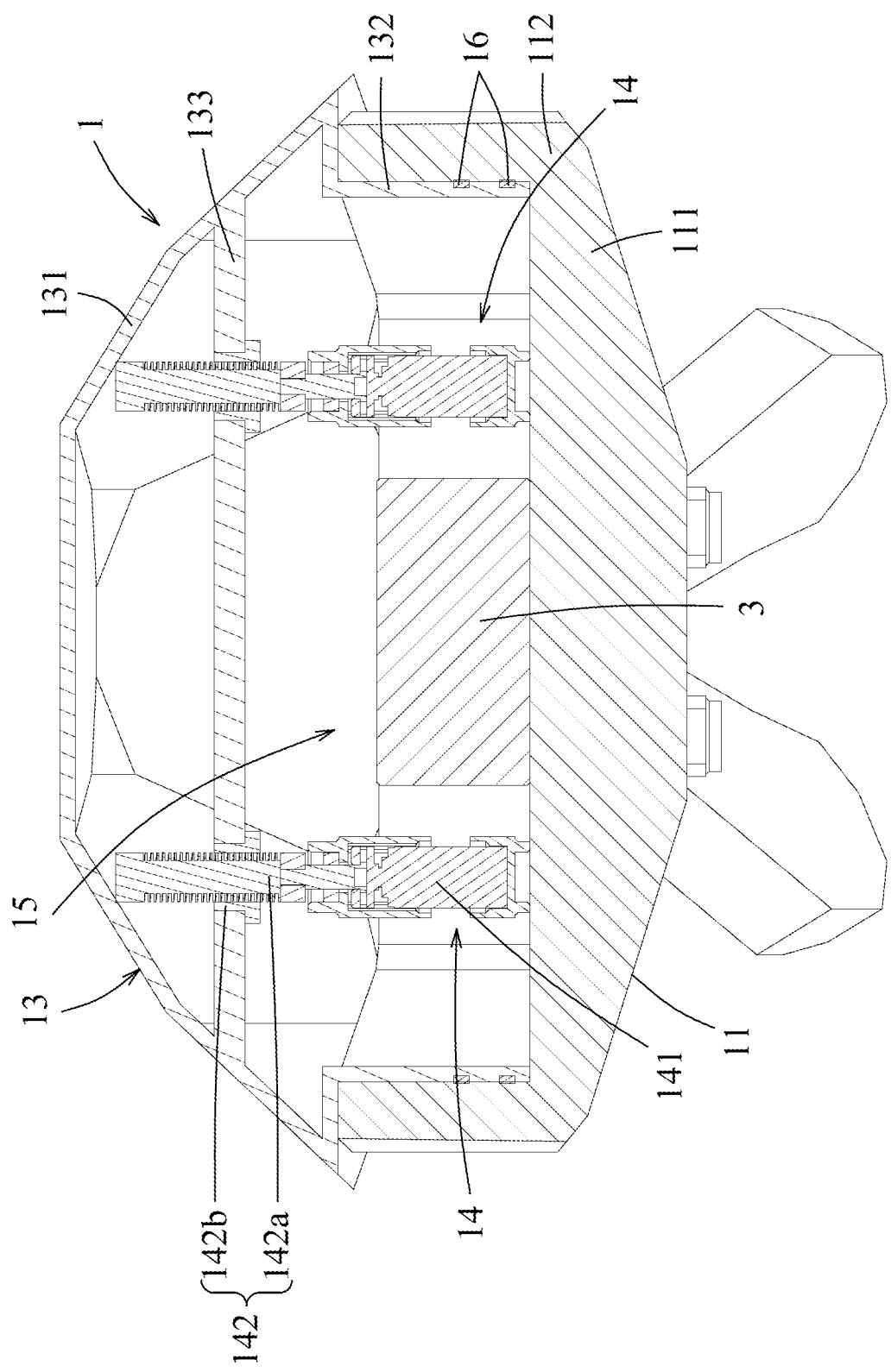
FIG. 12 is a sectional view illustrating a state when the dorsal shell of the third embodiment is in a lowered position.

With reference to FIGS. 10, 11 and 12, in a third embodiment, the dorsal shell 13 is deformable relative to the trunk 11 to vary the volume of the trunk unit 1. In this embodiment, the dorsal shell 13 is movable relative to the trunk 11 in the up-down direction between a raised up position (see FIG. 11) and a lowered position (see FIG. 12). The trunk unit 1 includes two driving mechanisms 14 which cooperatively actuate the movement of the dorsal shell 13. Specifically, the trunk 11 has a bottom wall 111 and a surrounding wall 112 which extends upwardly from a periphery of the bottom wall 111. The dorsal shell 13 has an upper shell wall 131 which is opposite to the bottom wall 111 in the up-down direction, a peripheral shell wall 132 which extends downwardly from a periphery of the upper shell wall 131 and which is disposed inboard of and abuts against the surrounding wall 111, and a support plate 133 which is connected with the upper shell wall 131. The trunk unit 1 further has two water seal rings 16 which are interposed between the surrounding wall 112 and the peripheral shell wall 132 for preventing liquid entrance into the trunk unit 1. In this embodiment, the water seal rings 16 are disposed adjacent to a bottom end of the peripheral shell wall 132 and spaced apart from each other. By means of the two water seal rings 16, water sealing is enhanced. It is noted that the trunk unit 1 alternatively may only have one water seal ring 16.

The two driving mechanisms 14 are disposed in the accommodation space 15 and are spaced apart from each other in the left-right direction. Each driving mechanism 14 has a drive motor 141 and a transmission module 142 which is coupled with the drive motor 141 and the dorsal shell 13. The transmission module 142 has a screw bolt (142a) which extends in the up-down direction and which is coupled with and actuated by the drive motor 141, and a screw nut (142b) which is securely disposed on the dorsal shell 13 and threadedly engaged with the screw bolt (142a). In this embodiment, the support plate 133 has two through holes such that the screw bolts (142a) of the two driving mechanisms 14 respectively extend through the through holes. A torque generated as a result of rotation of the screw bolt (142a) is converted to a linear movement of the screw nut (142b) in the up-down direction to move the dorsal shell 13 relative to the trunk 11 toward one of the raised up position and the lowered position. Thus, the trunk 11 and the dorsal shell 13 cooperatively have a variable volume which is larger when the dorsal shell 13 is in the raised up position than when the dorsal shell 13 is in the lowered position. Similarly, when the dorsal shell 13 is moved toward the raised up position, the volume of the trunk unit 1 is increased and the density thereof is decreased. On the contrary, when the dorsal shell 13 is moved toward the lowered position, the volume of the trunk unit 1 is decreased and the density thereof is increased. Since the construction and function of the control unit 3 are similar to those in the previous embodiments, detailed description thereof is dispensed with.

Figure 13:
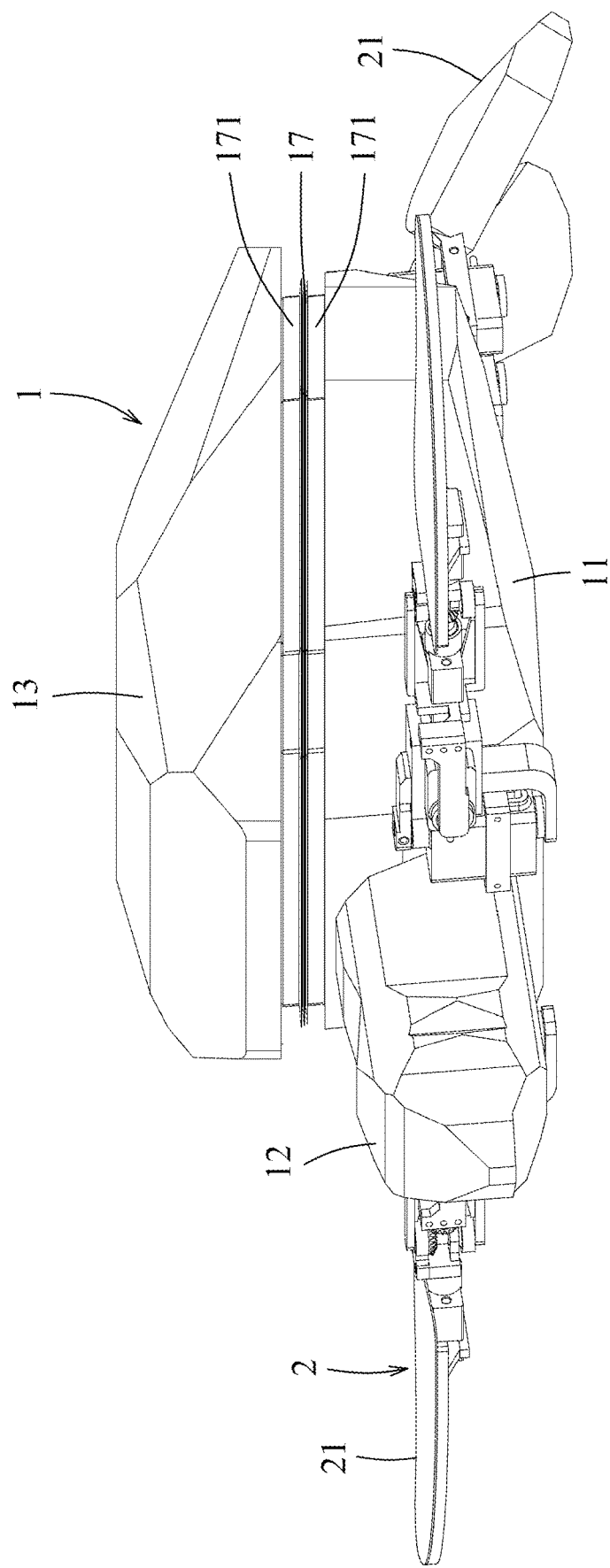
FIG. 13 is a perspective view illustrating a fourth embodiment of the biomimetic turtle device according to the disclosure.
Figure 14:
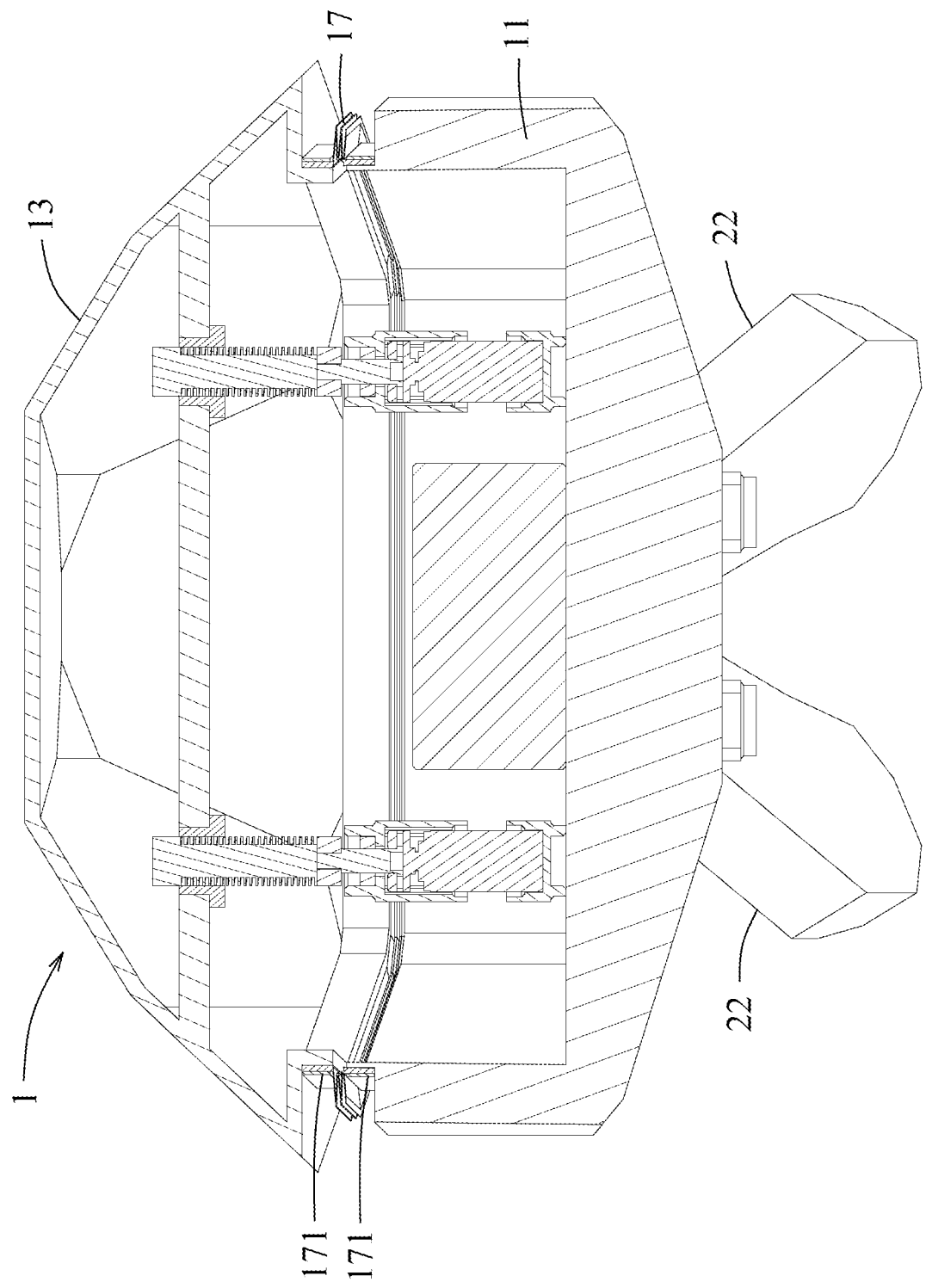
FIG. 14 is a sectional view illustrating a state when a dorsal shell of the fourth embodiment is in a raised up position.
Figure 15:
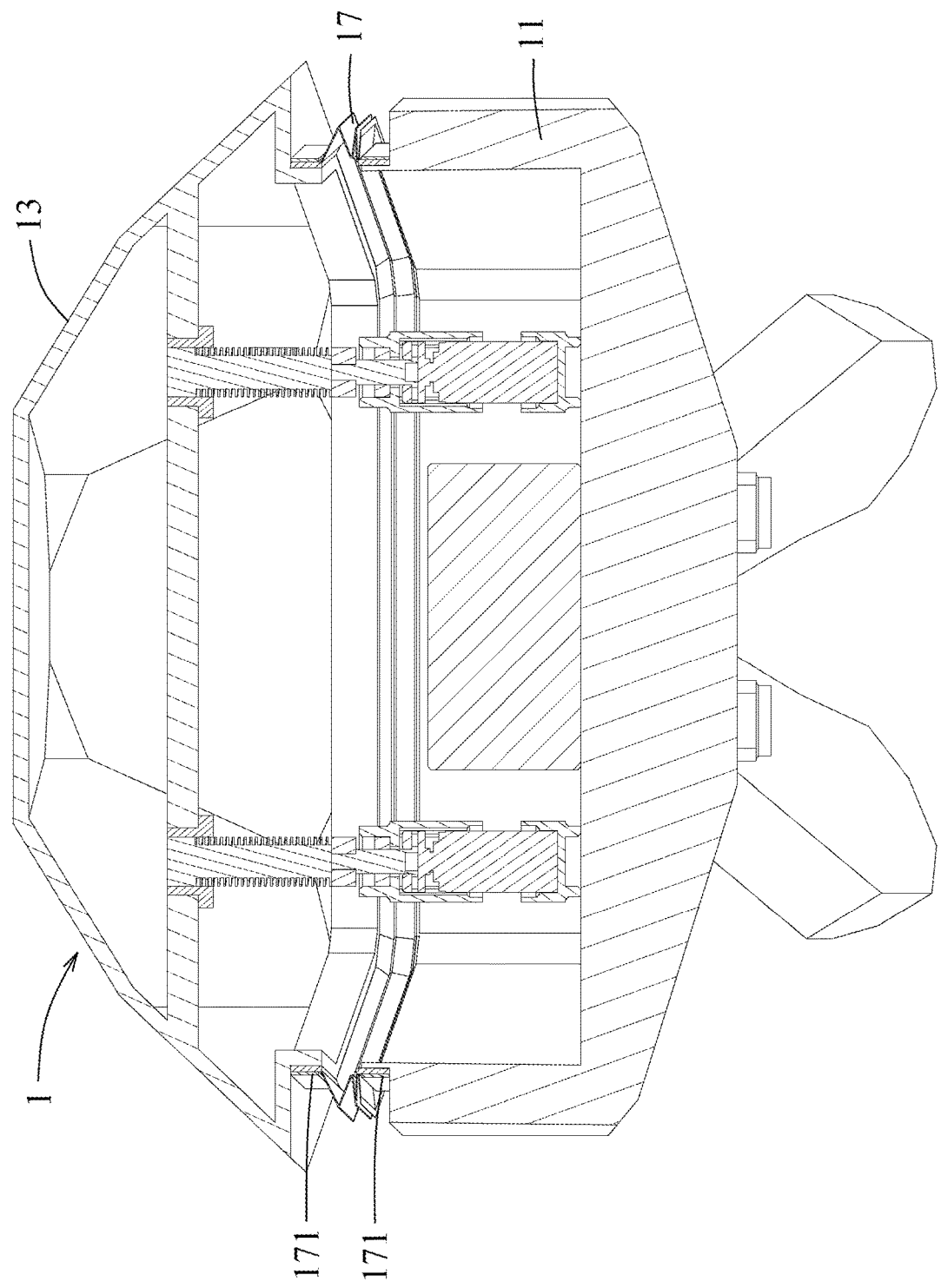
FIG. 15 is a sectional view illustrating a state when the dorsal shell of the fourth embodiment is in a lowered position.

With reference to FIGS. 13, 14 and 15, in a fourth embodiment, the difference from the third embodiment resides in that the trunk unit 1 has a waterproof elastomeric sleeve 17 which interconnects the trunk 11 and the dorsal shell 13 and which extends and is deformable in the up-down direction. Specifically, the waterproof elastomeric sleeve 17 has two end portions which are respectively sleeved on the trunk 11 and the dorsal shell 13 and fixed on the trunk 11 and the dorsal shell 13 by means of two metallic snap rings 171 and seal adhesives so as to enhance the water sealing of the trunk unit 1. The waterproof elastomeric sleeve 17 is elastomerically deformable along with the movement of the dorsal shell 13.

Figure 16:
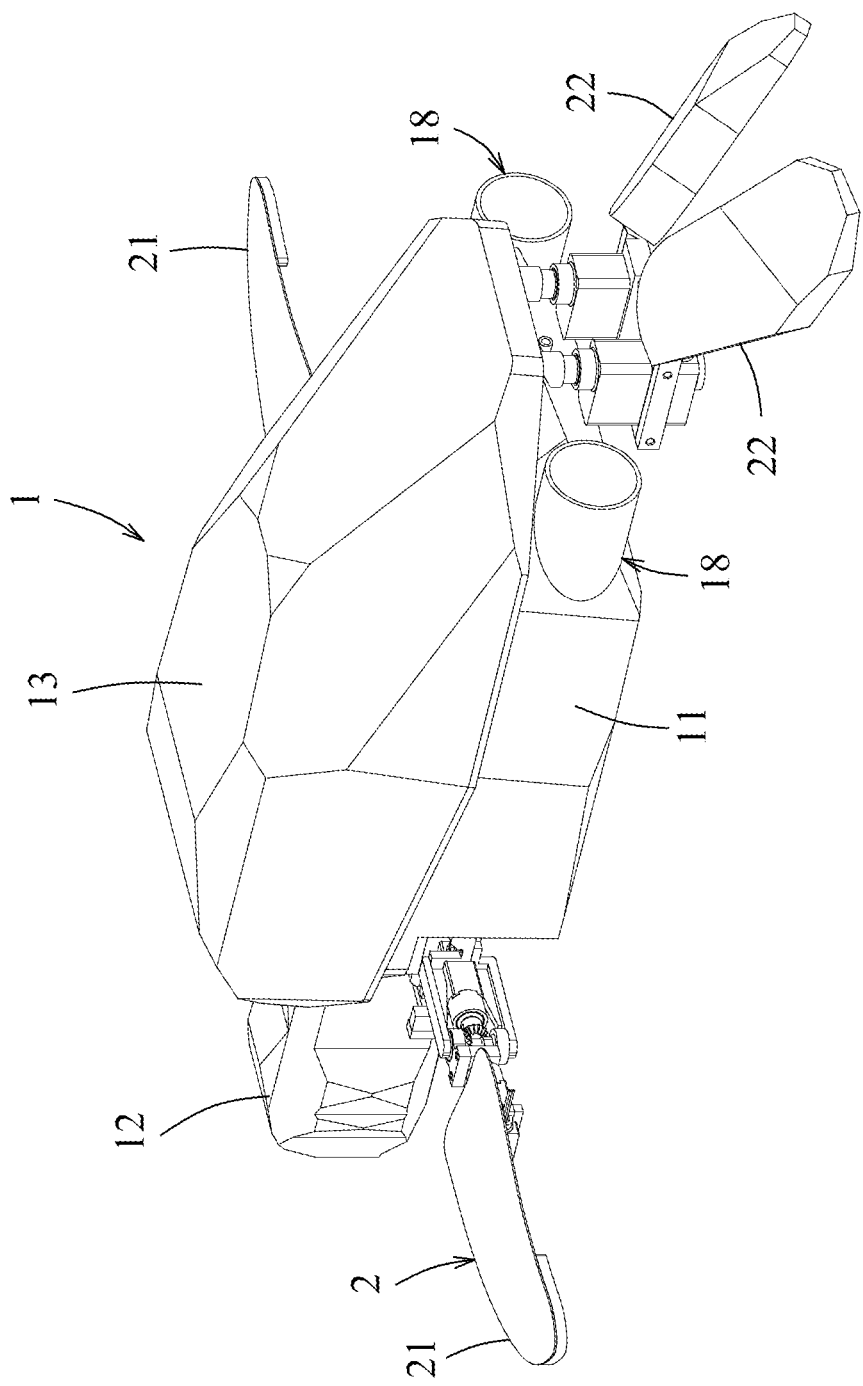
FIG. 16 is a perspective view illustrating a fifth embodiment of the biomimetic turtle device according to the disclosure.
Figure 17:
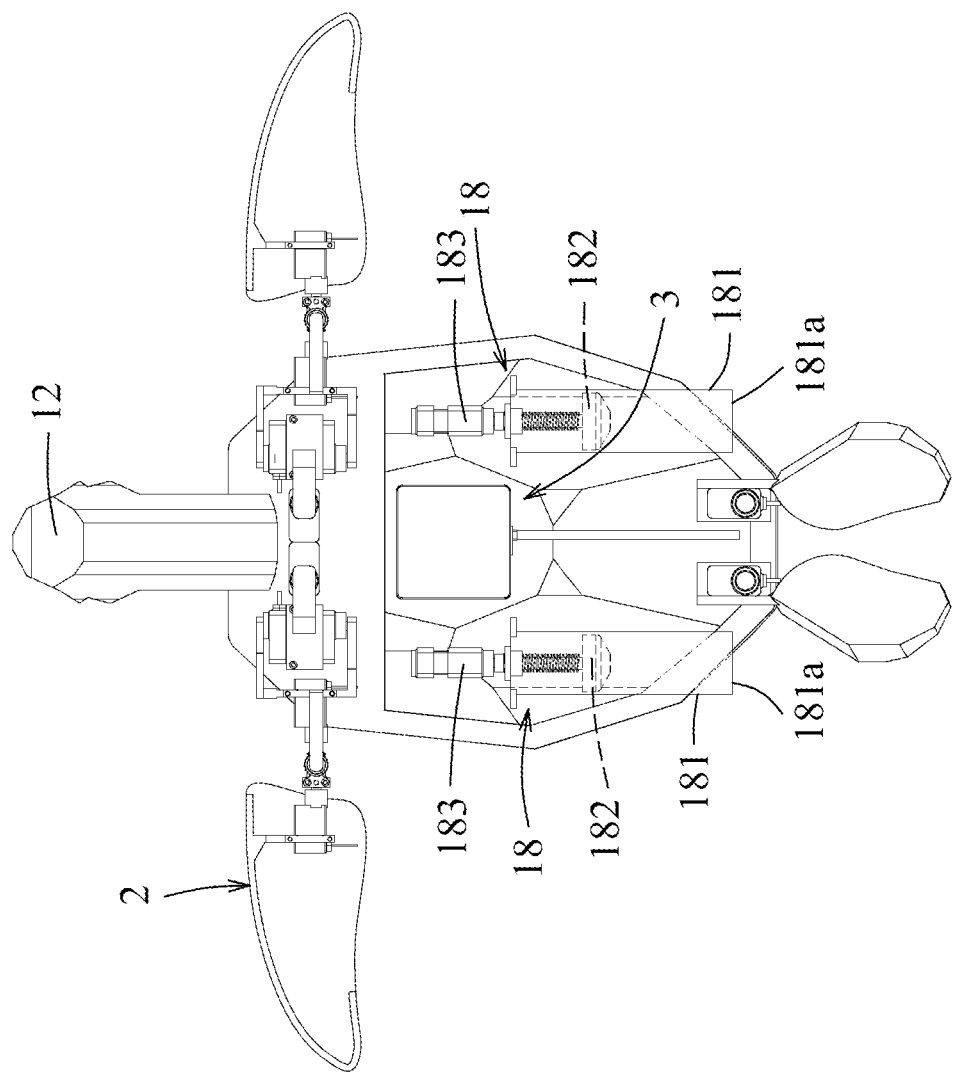
FIG. 17 is a top view of the fifth embodiment, a dorsal shell being removed for the sake of clarity.

With reference to FIGS. 16 and 17, in a fifth embodiment, the biomimetic turtle device includes a trunk unit 1, a limb unit 2 and a control unit 3. The trunk unit 1 includes a trunk 11 which has two water reservoirs 181 formed therein, a head 12 which is connected with a front portion of the trunk 11, a dorsal shell 13 which is connected with a top portion of the trunk 11, and two weight adjusting mechanisms 18 which are disposed within the trunk 11 and operable to actuate water storage or discharging of water from the water reservoir 181 to vary the weight of the trunk unit 1. Specifically, in this embodiment, each water reservoir 181 has an opened end (181a) projecting from the trunk 11. Each weight adjusting mechanism 18 includes a piston module 182 which is movably disposed in the water reservoir 181, and a drive motor 183 which is operable to actuate the movement of the piston module 182. Through the movement of the piston module 182 in the water reservoir 181, water is pumped into or discharged from the water reservoir 181. That is, when the piston module 182 is moved away from the opened end (181a), water is pumped into the water reservoir 181. When the piston module 182 is moved toward the opened end (181a), the water is discharged from the water reservoir 181. The weight of the trunk unit 1 is increased (decreased) when the amount of water in the water reservoirs 181 is increased (decreased), and hence the density of the trunk unit 1 is increased (decreased).

In this embodiment, since the construction and function of the limb unit 2 and the control unit 3 are similar to those in the previous embodiments, detailed description thereof is omitted. In the control unit 3, the circuit module 32 receives the signal from the water depth sensor 31 and determines if the biomimetic turtle device is at a target water depth position. The weight adjusting mechanisms 18 are operated to vary the weight of the trunk unit 1 if the biomimetic turtle device is not at the target water depth position so as to adjust the density of the trunk unit 1 to thereby adjust a water depth position of the biomimetic turtle device, as described above in the previous embodiments.

As illustrated, with the control unit which is operated to adjust the density of the biomimetic turtle device by varying the volume or weight of the trunk unit based on the current water depth position of the biomimetic turtle device, the biomimetic turtle device is controllable to float upward, dive downward or to be kept at a fixed level position in the water.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A biomimetic turtle device comprising:
   a trunk unit including a trunk, a head which is connected with a front portion of said trunk, a dorsal shell which is connected with a top portion of said trunk, and at least one driving mechanism which is operable to actuate deformation of at least one of said head and said dorsal shell relative to said trunk to vary volume of said trunk unit;
   a limb unit including a pair of front limb mechanisms and a pair of rear limb mechanisms; and
   a control unit including a water depth sensor which detects water depth where said biomimetic turtle device is and sends a signal, and a circuit module which is electronically connected with said driving mechanism, said limb unit and said water depth sensor, said circuit module receiving the signal from said water depth sensor and determining if said biomimetic turtle device is at a target water depth position, wherein said driving mechanism is operated to vary the volume of said trunk unit if said biomimetic turtle device is not at the target water depth position so as to adjust density of said trunk unit to thereby adjust a water depth position of said biomimetic turtle device.

2. The biomimetic turtle device of claim 1, wherein said head has a fixed portion which is securely connected with said trunk, and a movable portion which is connected with said fixed portion and movable relative to said fixed portion between a forward extending position and a rearward retracted position in a front-rear direction, said head having a variable volume which is larger when said movable portion is in the forward extending position than when said movable portion is in the rearward retracted position, said driving mechanism having a drive motor and a transmission module which is coupled with said drive motor and said movable portion and actuated by said drive motor to bring said movable portion to move toward one of the forward extending position and the rearward retracted position.

3. The biomimetic turtle device of claim 2, wherein said transmission module has a screw bolt which extends in the front-rear direction and which is coupled with and actuated by said drive motor, and a screw nut which is securely disposed on said movable portion and threadedly engaged with said screw bolt such that a torque generated as a result of rotation of said screw bolt is converted to a linear movement of said screw nut in the front-rear direction to move said movable portion relative to said fixed portion.

4. The biomimetic turtle device of claim 2, wherein said movable portion is coaxially sleeved around said fixed portion, said head having at least one water seal ring which is interposed between said fixed portion and said movable portion for preventing liquid entrance into said head.

5. The biomimetic turtle device of claim 2, wherein said head has a waterproof elastomeric sleeve which interconnects said fixed portion and said movable portion and which extends and is deformable in the front-rear direction.

6. The biomimetic turtle device of claim 1, wherein said dorsal shell is movable relative to said trunk in an up-down direction between a raised up position and a lowered position, said trunk and said dorsal shell cooperatively having a variable volume which is larger when said dorsal shell is in the raised up position than that when said dorsal shell is in the lowered position, said driving mechanism having a drive motor and a transmission module which is coupled with said drive motor and said dorsal shell and actuated by said drive motor to bring said dorsal shell to move toward one of the raised up position and the lowered position.

7. The biomimetic turtle device of claim 6, wherein said transmission module has a screw bolt which extends in the up-down direction and which is coupled with and actuated by said drive motor, and a screw nut which is securely disposed on said dorsal shell and threadedly engaged with said screw bolt such that a torque generated as a result of rotation of said screw bolt is converted to a linear movement of said screw nut in the up-down direction to move said dorsal shell relative to said trunk.

8. The biomimetic turtle device of claim 6, wherein said trunk has a bottom wall and a surrounding wall which extends upwardly from a periphery of said bottom wall, said dorsal shell having an upper shell wall which is opposite to said bottom wall in the up-down direction, and a peripheral shell wall which extends downwardly from a periphery of said upper shell wall and which is disposed inboard of and abuts against said surrounding wall, said trunk unit having at least one water seal ring which is interposed between said surrounding wall and said peripheral shell wall for preventing liquid entrance into said trunk unit.

9. The biomimetic turtle device of claim 6, wherein said trunk unit further includes a waterproof elastomeric sleeve which interconnects said trunk and said dorsal shell and which extends and is deformable in the up-down direction.

10. A biomimetic turtle device comprising:
    a trunk unit including a trunk which has at least one water reservoir therein, a head which is connected with a front portion of said trunk, a dorsal shell which is connected with a top portion of said trunk, and at least one weight adjusting mechanism which is disposed within said trunk and operable to actuate water storage or discharging of water from said water reservoir to vary weight of said trunk unit;
    a limb unit including a pair of front limb mechanisms and a pair of rear limb mechanisms; and
    a control unit including a water depth sensor which detects water depth where said biomimetic turtle device is and sends a signal, and a circuit module which is electronically connected with said weight adjusting mechanism, said limb unit and said water depth sensor, said circuit module receiving the signal from said water depth sensor and determining if said biomimetic turtle device is at a target water depth position, wherein said weight adjusting mechanism is operated to vary the weight of said trunk unit if said biomimetic turtle device is not at the target water depth position so as to adjust density of said trunk unit to thereby adjust a water depth position of said biomimetic turtle device.

11. The biomimetic turtle device of claim 10, wherein said weight adjusting mechanism includes a piston module which is movably disposed in said water reservoir, and a drive motor which is operable to actuate movement of said piston module.

* * * * *